Oct. 13, 1964 R. H. RINES 3,153,236
SYSTEM AND METHOD FOR DETECTION
Original Filed June 23, 1943
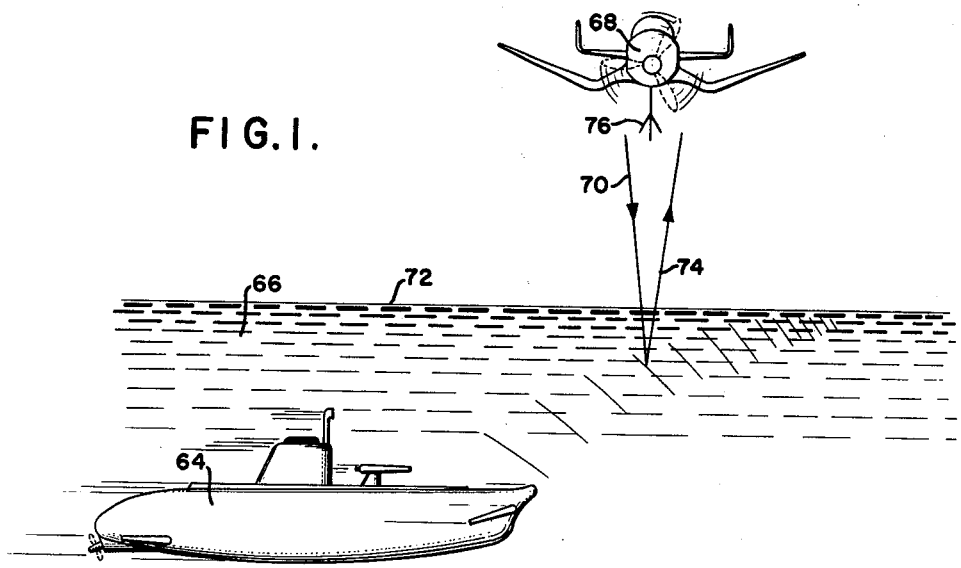
FIG.I.
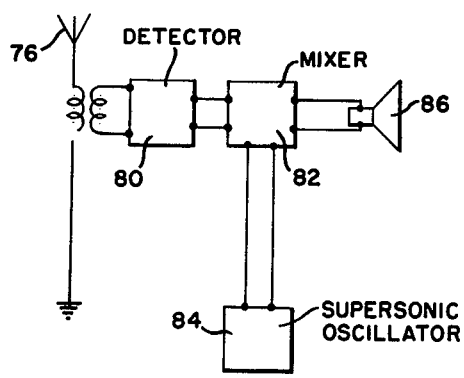
FIG.2.
INVENTOR
ROBERT HARVEY RINES
BY *Rines and Rines*
ATTORNEYS

United States Patent Office 3,153,236
Patented Oct. 13, 1964

3,153,236
SYSTEM AND METHOD FOR DETECTION
Robert Harvey Rines, Newton, Mass.
(40 Broad St., Room 1018, Boston 9, Mass.)
Original application June 23, 1943, Ser. No. 492,167, now Patent No. 2,539,476, dated Jan. 30, 1951. Divided and this application Jan. 22, 1951, Ser. No. 207,199
16 Claims. (Cl. 343—18)

The present invention relates to a system and method for detection, and more particularly to the use of radio-frequency energy for detecting the presence of elastic vibrations in a radio-wave-reflecting medium. This application is a division of copending parent application, Serial No. 492,167, filed June 23, 1943, for System and Method of Communication, now Patent No. 2,539,476, issued January 30, 1951.

An object of the invention is to provide a new and improved system and method for detecting submarines.

Other and further objects will be explained hereinafter and will be particularly pointed out in the appended claims.

The invention will now be more fully explained in connection with the accompanying drawing in which FIG. 1 is a diagrammatic view of a preferred apparatus illustrating the reflection of radio waves from the surface of a body of water that is subjected to elastic vibrations by an underwater submarine, and FIG. 2 is a schematic circuit diagram of a preferred receiving apparatus.

As disclosed in the said parent application, it has been found that if a radio-wave reflecting medium is subjected to mechanical vibrations, such as elastic waves, during the reflection of radio-frequency energy therefrom, the reflected radio-frequency energy will be found to have become modulated with a modulation frequency of the same periodicity as the mechanical vibrations. This phenomenon is utilized in the present invention for the detection from the air above the water of underwater submarines or other underwater sources that cannot be detected directly by radio waves because of the radio-wave-impervious nature of a water medium.

A submerged, moving submarine 64 is shown in FIG. 1 emitting mechanical elastic-wave vibrations, sonic and ultrasonic, into the water 66. Radio waves beamed or radiated along a path 70 from, for example, a radar or other system carried by an airplane 68, will strike the surface 72 of the water 66, to be reflected or scattered from regions of the water near the surface 72 along a path 74 back to the airplane 68. Since the surface of the water as well as the submarine constitutes a radio-wave reflecting surface that is being subjected to strong elastic vibrations produced by the submarine 64, the reflected or scattered waves traveling along the path 74 will have become modulated by these mechanical vibrations in accordance with the above-described phenomenon disclosed in the said parent application.

The modulation of the reflected or scattered radio waves produced by the vibrations emitted by the submarine 64 may be differentiated from any spurious modulation produced by other well-known sources of vibrations such as, for example, by water-wave motion or by shrimp and other fish as well as organisms in the water, by virtue of the fact that submarines are known to emit distinctive, continuous, very strong, predetermined, relatively high-frequency vibrations outside the vibration frequency spectrum produced by the random motion of water waves and by these various fish and other organisms. Many submarines, for example, are known to produce extremely strong vibrations while in motion in the neighborhood of a few thousand cycles per second. The modulation effects caused by these continuous strong vibrations can, of course, be distinguished from the effects of weaker vibrations of a discontinuous nature, from vibrations of different frequency, and from vibrational effects of a more random character.

The modulated reflected or scattered radio waves may be received by the antenna 76 of the aircraft or other radio-detecting station. The receiving system associated with the antenna 76 for analyzing the received waves may have any desired form such as the form, for example, of the circuit shown in FIG. 2. This receiver comprises radio-frequency receiving and demodulating or detecting circuits 80. Any desired detected modulation frequency may, of course, be filtered out. If an ultrasonic modulation frequency produced by the submarine 64, for example, is to be detected, the demodulated signal may be fed to a mixing system 82 to which may be supplied a different ultrasonic frequency from an ultrasonic-frequency local oscillator source 84. Any desired audio-frequency beat signal may thus be produced for indication in a loud speaker 86 or in any other type of indicator when the submarine is present in the water, thereby to provide an indication of the presence or the absence of the submarine or other source of vibrations in the water.

It is to be understood, of course, that the small angle of incidence and reflection of the transmitted and received paths 70 and 74 and the shown degree of submersion of the submarine are illustrative only. Propagation of the waves along the surface of the water between transmitter and receiver may also be utilized.

The direction or location of the elastic vibration source, such as the submarine, is that direction and location of the radio beam in which is detected a maximum modulation effect upon the radio waves received after reflection and scatter from the water.

Modifications will occur to those skilled in the art and all such are considered to fall within the spirit and scope of the invention as defined in the appended claims.

What is claimed is:

1. A method of detecting under-water submarines that comprises radiating radio waves from a point above the surface of the water to the surface of the water containing a submarine that is emitting sonic or ultrasonic vibrations, receiving the radio waves reflected or scattered from the surface of the water, and analyzing the received waves to detect sonic or ultrasonic modulation of the received waves reflected or scattered from the surface of the water in the vicinity of the submarine, thereby to indicate the presence of the submarine.

2. A method of detecting under-water submarines that comprises radiating radio waves to the surface of the water containing a submarine that is emitting sonic or ultrasonic vibrations of known frequencies, receiving the radio waves reflected or scattered from the surface of the water, analyzing the received waves to detect modulation thereupon of the known sonic or ultrasonic frequencies of vibration of the submarine, and determining the direction in which the reflected or scattered waves contains a maximum of such modulation, thereby to locate the submarine.

3. A method of detecting under-water submarines that comprises radiating radio waves from an aircraft to the surface of the water containing a submarine that is emitting sonic or ultrasonic vibrations of known frequencies, receiving in the aircraft the radio waves reflected or scattered from the surface of the water, analyzing the received waves to detect modulation thereupon of the known sonic or ultrasonic frequencies of vibration of the submarine, and determining the direction in which the reflected or scattered waves contains a maximum of such modulation, thereby to locate the submarine.

4. A method of detecting the presence of a source of elastic vibrations of predetermined frequency disposed in a medium impervious to radio waves that comprises radiating radio waves to a surface of the radio-wave-impervious medium, receiving the radio waves reflected or scattered from the said surface of the medium, and analyzing the received waves to detect a modulation of the predetermined frequency of the received waves, thereby to indicate the presence of the source of elastic vibrations.

5. A system for detecting under-wave submarines having, in combination, means for radiating radio waves to the surface of the water containing a submarine that is emitting sonic or ultrasonic vibrations of known frequencies, means for receiving the radio waves reflected or scattered from the surface of the water, means for analyzing the received waves to detect modulation thereupon of the known sonic or ultrasonic frequencies of vibration and means for indicating the detected modulation to indicate the presence of the submarine.

6. The system claimed in claim 5 and in which the angle of incidence and reflection of the radiated and received radio waves is small.

7. A system for detecting under-water submarines having, in combination, means for radiating radio waves along the surface of the water containing a submarine that is emitting sonic or ultrasonic vibrations of known frequencies, means for receiving the radio waves propagated along the surface of the water in the vicinity of the submarine, means for analyzing the received waves to detect modulation thereupon of the known sonic or ultransonic frequencies of vibration and means for indicating the detected modulation to indicate the presence of the submarine.

8. A system for detecting under-water submarines having, in combination, means for radiating radio waves to the surface of the water containing a submarine that is emitting sonic or ultrasonic vibrations of known frequencies, means for receiving the radio waves reflected or scattered from the surface of the water, means for mixing the received waves with local oscillations to produce audio-frequency beat signals thereby to detect the modulation upon the received waves of the known sonic or ultrasonic frequencies of vibration and loud-speaker means for indicating the detected modulation to indicate the presence of the submarine.

9. A system for detecting under-water submarines that comprises means for radiating radio waves from a point above the surface of the water to the surface of the water containing a submarine that is emitting sonic or ultrasonic vibrations, means for receiving the radio waves reflected or scattered from the surface of the water, and means for analyzing the received waves to detect sonic or ultrasonic modulation of the received waves reflected or scattered from the surface of the ocean in the vicinity of the submarine, thereby to indicate the presence of the submarine.

10. A system for detecting under-water submarines that comprises means for radiating radio waves to the surface of the water containing a submarine that is emitting sonic or ultrasonic vibrations of known frequencies, means for receiving the radio waves reflected or scattered from the surface of the water, means for analyzing the received waves to detect modulation thereupon of the known sonic or ultrasonic frequencies of vibration of the submarine, and means for determining the direction in which the reflected or scattered waves contains a maximum of such modulation, thereby to locate the submarine.

11. A system for detecting under-water submarines that comprises means for radiating radio waves from an aircraft to the surface of the water containing a submarine that is emitting sonic or ultrasonic vibrations of known frequencies, means for receiving in the aircraft the radio waves reflected or scattered from the surface of the water, means for analyzing the received waves to detect modulation thereupon of the known sonic or ultrasonic frequencies of vibration of the submarine, and means for determining the direction in which the reflected or scattered waves contains a maximum of such modulation, thereby to locate the submarine.

12. A system for detecting the presence of a source of elastic vibrations of predetermined frequency disposed in a medium impervious to radio waves that comprises means for radiating radio waves to a surface of the radio-wave-impervious medium, means for receiving the radio waves reflected or scattered from the said surface of the medium, and means for analyzing the received waves to detect a modulation of the predetermined frequency of the received waves, thereby to indicate the presence of the source of elastic vibrations.

13. A system for detecting under-water submarines completely submerged below the surface of the water, having, in combination, means for radiating radio waves to the surface of the water containing a submarine that is emitting sonic vibrations of known frequencies, means for receiving the radio waves reflected or scattered from the surface of the water, means for analyzing the received waves to detect modulation thereupon of the known sonic frequencies of vibration and means for indicating the detected modulation to indicate the presence of the submarine.

14. A method of detection that comprises radiating radio waves to the surface of a body of water containing a moving propeller and the like that is emitting sonic or ultrasonic vibrations and correspondingly disturbing the water, receiving the radio waves reflected or scattered from the surface of the water, and analyzing the received waves to detect sonic or ultrasonic modulation of the received waves reflected or scattered from the water surface in the vicinity of the propeller, thereby to indicate the presence of the same.

15. A method of detection that comprises radiating ratio waves to the surface of a body of water containing a moving propeller and the like that is emitting sonic or ultrasonic vibrations of known frequencies and correspondingly disturbing the water, receiving the radio waves reflected or scattered from the surface of the water, analyzing the received waves to detect modulation thereupon of the known sonic or ultrasonic frequencies of vibration of the propeller and the like, and determinating the direction in which the reflected or scattered waves contains a maximum of such modulation, thereby to locate the propeller and the like.

16. A method of distinguishing radio-wave reflections from the surface of a body of water that comprises radiating radio waves to the surface of the water containing at a region thereof a moving propeller and the like that is emitting sonic or ultrasonic vibrations of known frequencies and correspondingly disturbing the water at that region, receiving the radio waves reflected or scattered from the surface of the water, analyzing the received waves to detect modulation thereupon of the known sonic or ultrasonic frequencies of vibration of the propeller and the like, thereby to distinguish the radio waves received from the said region from those received from other regions of the said surface of the water.

(References on following page)

References Cited in the file of this patent

UNITED STATES PATENTS

| | | |
|---|---|---|
| 1,987,587 | Drake | Jan. 8, 1935 |
| 2,018,463 | Muchow | Oct. 22, 1935 |
| 2,212,110 | Beuermann | Aug. 20, 1940 |
| 2,361,177 | Chilowsky | Oct. 24, 1944 |
| 2,432,984 | Budenbom | Dec. 23, 1947 |
| 2,513,279 | Bradley | July 4, 1950 |
| 2,520,008 | King | Aug. 22, 1950 |

OTHER REFERENCES

"Reflection of Electromagnetic Waves from Sound Waves," by H. J. Schmitt, Aug. 10, 1959, Technical Report No. 310, Cruft Laboratory Harvard University, Cambridge, Mass. Office of Naval Research AD222886 NR-371-016. ASTIA date Oct. 19, 1959. This publication contains 18 pp. of description and 7 pp. of dwg.; pages 13 to 18 and FIGURE 6 relied upon.